C. C. TARBELL.
TRANSMISSION GEARING FOR STATION INDICATORS.
APPLICATION FILED FEB. 9, 1916.
1,245,064.
Patented Oct. 30, 1917.
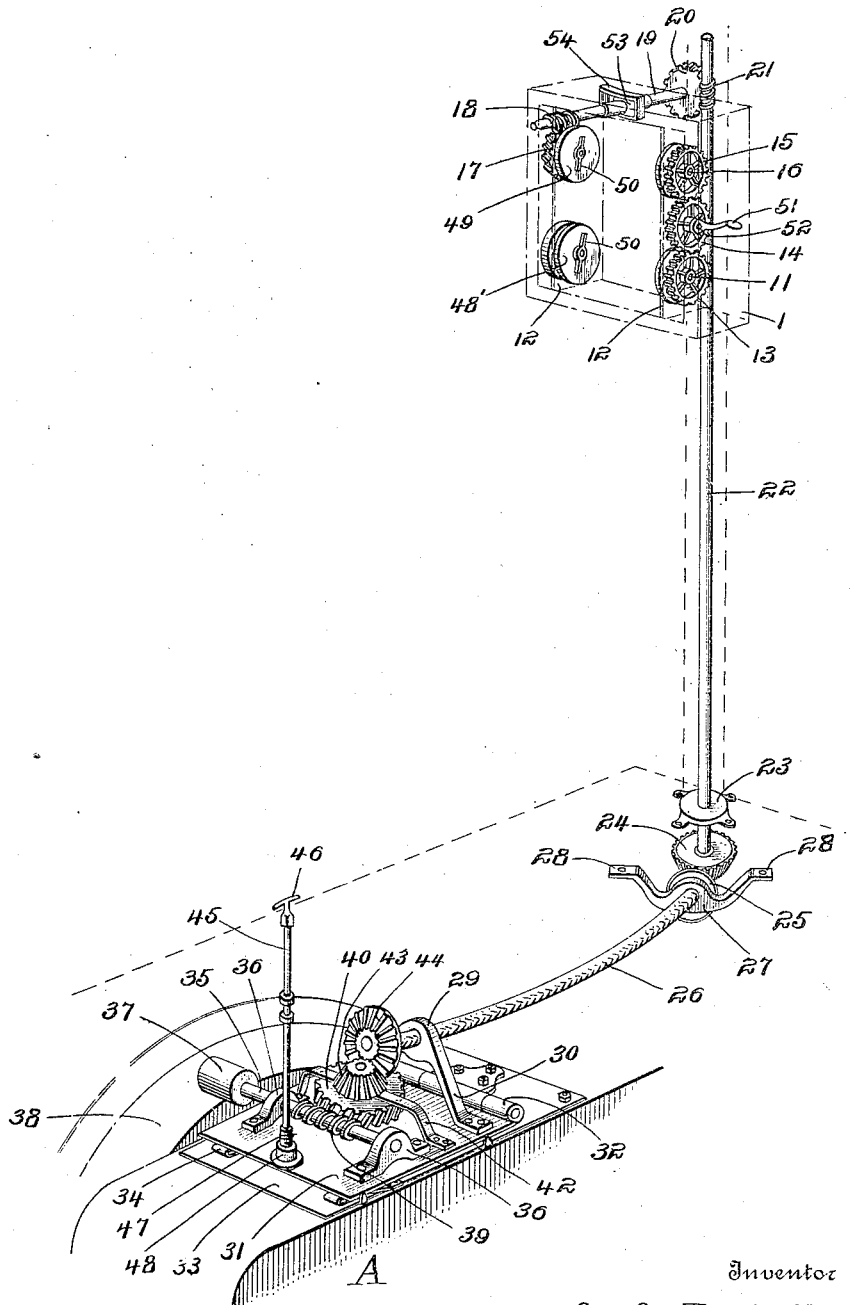
Inventor
C. C. Tarbell
Witnesses
A. C. Newkirk.
P. M. Smith.
By Victor J. Evans
Attorney

UNITED STATES PATENT OFFICE.

CASSIUS C. TARBELL, OF EL PASO, TEXAS.

TRANSMISSION-GEARING FOR STATION-INDICATORS.

1,245,064.  Specification of Letters Patent.  Patented Oct. 30, 1917.

Application filed February 9, 1916. Serial No. 77,212.

*To all whom it may concern:*

Be it known that I, CASSIUS C. TARBELL, a citizen of the United States, residing at El Paso, in the county of El Paso and State of Texas, have invented new and useful Improvements in Transmission-Gearing for Station-Indicators, of which the following is a specification.

This invention relates to the transmission gearing for station indicators, the object in view being to provide a device of the character referred to adapted to be mounted upon any railway or street car for the purpose of accurately indicating or displaying the names of the stations or streets in consecutive order, the gearing operating automatically and being actuated primarily by a rotary element of the wheel base of the car, while the car is in motion and the movement thereof terminating as soon as the car is brought to a stop.

A further object of the invention is to provide means whereby the indicator may be thrown out of operation whenever it should become necessary to do so.

With the above and other objects in view, the invention consists in the novel construction, combination and arrangement of parts, as herein described, illustrated and claimed.

The accompanying drawing is a perspective view illustrating the general arrangement of the transmission gearing.

1 designates an indicator case containing a shaft 11 journaled in bearing uprights 12 within the casing 1 and having fast thereon a gear 13 which meshes with an idler gear 14 in turn meshing with a gear 15 on the shaft 16. The shaft 16 has fast on the opposite end thereof a worm gear 17 which meshes with and is actuated by a worm 18 on a worm shaft 19. This shaft 19 carries at its other end a worm gear 20 which meshes with and is driven by a worm 21 on an upright shaft 22 which extends downwardly through the floor of the car where it is journaled in a bearing 23.

At is lower end the upright shaft 22 is provided with a bevel gear 24 which meshes with and is driven by a bevel pinion 25 on one end of a flexible shaft 26 which is journaled at one end in a bearing 27 provided with attaching feet 28 by means of which it is secured to the floor of the car. The other end of the flexible shaft 26 is journaled in a bearing 29 the legs 30 of which are fastened to a movable base 31 shown in the form of a plate which is hinged along one edge as shown at 32 to an underlying support or bed plate 33 secured in fixed relation to the wheel base or car truck which is designated generally at A. The free end of the base plate 31 is pressed upwardly by means of springs 34 arranged between the plate 31 and the plate 33. The purpose of these springs will presently appear.

An indicator driving shaft 35 is journaled in bearings 36 on the hinged base 31 and is provided at one end with a friction roller 37 which is adapted to roll in contact with the tread 38 of one of the car wheels whereby motion is imparted to the indicator mechanism. The shaft 35 carries a worm 39 which meshes with a worm wheel 40 on a short vertical shaft journaled in the hinged base 31 and in an arched bracket 42 also secured to the hinged base. On its upper end the shaft of the gear 40 has fast thereon a bevel gear 43 which meshes with a bevel gear 44 fast on the adjacent end of the flexible shaft 26.

In order to press and hold the wheel 37 in engagement with the tread 38 of the car wheel, I employ a vertically extending shaft 45 provided with a detachable handle 46 at the upper end thereof, the shaft 45 being journaled in suitable bearings and passing through the floor of the car. The lower end of the shaft 43 is threaded as shown at 47 and is inserted in an internally threaded boss 48 on the hinged base 31, so that by turning the shaft 45 with the aid of the handle 46, the hinged base 31 may be pressed downwardly so as to throw the wheel 37 against the tread 38 or by turning said shaft 45 in the opposite direction the plate 31 will be elevated by the springs 34 so as to move the wheel 37 out of contact with the tread 38. This enables the indicating mechanism to be thrown into and out of operation. The flexible shaft 26 provides for the relative movement between the body of the car and the truck frame or frame of the wheel base.

On the shafts 11 and 16 there are mounted roller holding heads 48′ and 49 each of which is provided with a diametrically extending key 50 adapted to enter a corresponding diametrical groove in the adjacent end of the respective roller. A detachable crank handle 51 is fitted to the shaft 52 of the idler gear 14 to provide for adjusting the position of the web 8 to render the same accurate in its readings.

The shaft 19 has the end thereof which carries the worm 18 movable laterally so that the worm 18 may be shifted temporarily out of engagement with the wheel 17. This is accomplished by journaling the shaft 19 in a bearing 53 which is slidable in an arcuate guide 54 fastened to the casing 1 or adjacent thereto. The bearing 53 may be slid in a direction to shift the worm 18 out of engagement with the wheel 17, this being done in order to accurately adjust and set the indicating mechanism.

Having thus described my invention, I claim:—

Transmission gearing for station indicators in railway cars comprising in combination, a supporting base having a hinged connection with the car truck frame, a horizontally disposed shaft journaled on said base, a friction wheel on said shaft adapted to engage one of the truck wheels, manually controlled means for shifting said supporting base to throw said friction wheel into and out of driving engagement with the car wheel indicating mechanism embodying a rotary shaft, and driving connections between said friction wheel shaft and said rotary shaft of the indicating mechanism, said driving connections comprising a flexible shaft having one end journaled in a bearing carried by said hinged supporting base and geared to said friction wheel shaft and having its other end geared to the shaft of the indicating mechanism.

In testimony whereof I affix my signature in presence of two witnesses.

CASSIUS C. TARBELL.

Witnesses:
J. B. Du Bose,
Frederick Guy.

Copies of this patent may be obtained for five cents each, by addressing the "Commissioner of Patents, Washington, D. C."